United States Patent [19]

Opower

[11] Patent Number: 5,220,577
[45] Date of Patent: Jun. 15, 1993

[54] WAVEGUIDE LASER WITH VARIABLE WAVEGUIDE THICKNESS

[75] Inventor: Hans Opower, Krailling, Fed. Rep. of Germany

[73] Assignee: Deutsche Forschungsanstalt fuer Luft- und Raumfahrt e.V., Bonn, Fed. Rep. of Germany

[21] Appl. No.: 745,593

[22] Filed: Aug. 15, 1991

[30] Foreign Application Priority Data

Aug. 22, 1990 [DE] Fed. Rep. of Germany ....... 4026516

[51] Int. Cl.$^5$ .............................................. H01S 3/08
[52] U.S. Cl. ...................... 372/92; 372/93; 372/95; 372/99; 372/64
[58] Field of Search .................. 372/55, 64, 92–94, 372/95, 99

[56] References Cited

U.S. PATENT DOCUMENTS

| 4,939,738 | 7/1990 | Opower | 372/64 |
| 5,050,181 | 9/1991 | Gekat | 372/64 |

OTHER PUBLICATIONS

G. L. Bourdet, et al., "High-Efficiency $CO_2$ Waveguide Laser," *Optics Communications*, vol. 60, No. 1, 2, Oct. 15, 1986, pp. 84–86.

*Primary Examiner*—Léon Scott, Jr.
*Attorney, Agent, or Firm*—Barry R. Lipsitz

[57] ABSTRACT

In order to improve a high-frequency excited high-power laser comprising two resonator mirrors arranged opposite one another, a gas discharge chamber, a waveguide having two reflecting waveguide surfaces located opposite one another and facing the gas discharge chamber and a beam path having an initial wave bundle, which expands with spatial coherence as a wave bundle system due to multiple back and forth reflection in a transverse direction between the waveguide surfaces, such that the expansion of the wave bundle system with spatial coherence in the transverse direction at right angles to the initial direction can be achieved by other means, it is suggested that the tangents at two first waveguide surface regions reflecting the initial wave bundle, these tangents extending at right angles to the initial direction, extend parallel to one another and that a distance between second waveguide surface regions following the first waveguide surface regions which reflect the initial wave bundle become steadily larger, proceeding from the distance between the first waveguide surface regions, over an expansion path in the direction of the transverse direction with increasing expansion of the wave bundle system.

17 Claims, 5 Drawing Sheets

WAVEGUIDE LASER WITH VARIABLE WAVEGUIDE THICKNESS

BACKGROUND OF THE INVENTION

The invention relates to a high-frequency excited high-power laser comprising two resonator mirrors having resonator mirror surfaces arranged opposite one another, a gas discharge chamber located between the resonator mirror surfaces, a waveguide extending between these resonator mirror surfaces and having two reflecting waveguide surfaces located opposite one another and facing the gas discharge chamber, and a beam path having an initial bundle of waves, this initial bundle expanding for its part towards the second mirror surface in an initial direction extending at right angles to a region of the first mirror surface and, due to multiple back and forth reflection between the second and the first mirror surfaces, expanding with spatial coherence as a wave bundle system between the waveguide surfaces in a transverse direction extending at right angles to the initial direction.

A high-frequency excited high-power laser of this type is known from EP-A-0 305 893.

In this laser, formation of the wave bundle system is brought about, proceeding from the initial wave bundle, as a result of the mirror surfaces being formed, for example cylindrically curved, in accordance with the mirror surfaces of an instable laser resonator.

The waveguide, on the other hand, comprises waveguide surfaces extending in two planes running parallel to one another. These waveguide surfaces reflect the beams on, without a change in direction, in the direction in which they are reflected by the resonator mirror surfaces.

The production and adjustment of the resonator mirror surfaces as mirror surfaces of an instable resonator gives rise to problems and can be complicated.

For this reason, the object underlying the invention is to improve a high-power laser of the generic type such that for forming the wave bundle system, proceeding from the initial wave bundle, an arrangement of the resonator mirror surfaces as those of an instable resonator is not absolutely imperative but that the expansion of the wave bundle system with spatial coherence in the transverse direction at right angles to the initial direction can be achieved by other means.

SUMMARY OF THE INVENTION

This object is accomplished in accordance with the invention for a high-power laser of the type described at the outset in that the tangents at two first waveguide surface regions reflecting the initial wave bundle, these tangents extending at right angles to the initial direction, extend parallel to one another and that a distance between second waveguide surface regions following the first waveguide surface regions which reflect the initial wave bundle becomes steadily larger, proceeding from the distance between the first waveguide surface regions, over an expansion path in the direction of the transverse direction and with increasing expansion of the wave bundle system. The inventive solution therefore creates the possibility of achieving the coherent expansion of the wave bundle system in the transverse direction due to the special shape of the waveguide surfaces so that no particular shape and arrangement of the resonator mirrors is required for this.

This provides, in a particularly simple manner, the possibility of producing a high-power laser of the type described at the outset as simply and inexpensively as possible, namely due to a suitable shape and arrangement of the waveguide surfaces.

It is especially favorable in the inventive solution that the mutual alignment of the waveguide surfaces does not require such sensitive adjustment in the present invention as the mutual arrangement of the resonator mirror surfaces and so, with the inventive embodiment, the resources required for adjustment, in particular, and the resources for holding the individual components in the adjusted complementary alignment are considerably reduced.

In an embodiment which is particularly favorable in view of its simple manufacture, the first mirror surface is designed to be plane.

Furthermore, it is advantageous from the point of view of costs for the second mirror surface to be designed to be plane. In a particularly preferred embodiment, the first and the second mirror surfaces are designed to be plane and extend in parallel alignment to one another.

The fact that the mirror surfaces are plane mirror surfaces does not, however, rule out the use of mirror surfaces having a different form in the present, inventive idea.

With respect to the design of the first waveguide surface regions, no details have been given within the framework of the embodiments described thus far. The first waveguide surface regions can have an appreciable width. It is, however, especially favorable when these are kept as narrow as possible, the first waveguide surface regions preferably having essentially an infinitesimally small extension, for example in width of line, in the transverse direction.

With regard to the type and design of the second waveguide regions, no details have so far been given. It is particularly favorable for the distance between the second waveguide surface regions following the first waveguide surface regions which reflect the initial wave bundle to become steadily larger in the transverse direction over the entire extension of these second waveguide surface regions.

The second waveguide surface regions can, in the one case, be designed essentially as planes.

It is, however, especially favorable when one of the waveguide surfaces is designed to be convex in the transverse direction and one of the waveguide surfaces is designed to be concave in the transverse direction so that the convex and concave curvatures of the waveguide surfaces create, in a simple manner, the possibility of having the second waveguide surface regions follow the first waveguide surface regions with parallel tangents by altering the curvature.

The simplest way to achieve curved waveguide surfaces is for the waveguide surfaces to be cylindrically curved in the transverse direction.

In the case of cylindrically curved waveguide surfaces, an axis of curvature is associated with each cylindrical curvature. The inventive waveguide surfaces can then be arranged relative to one another in a particularly simple manner when the axes of curvature of the waveguide surfaces extend parallel to and at a distance from one another. Alternatively, it is also conceivable for the axes of curvature to be located in one plane but form an angle with one another. As an additional alternative it is conceivable for the axes of curvature to be skewed relative to one another.

With regard to the alignment of the mirror surfaces relative to the axes of curvature, no details have been given in the embodiments described so far. In a preferred embodiment, one mirror surface extends at right angles to an axis of curvature. It is, however, even more advantageous for both mirror surfaces to extend at right angles to the one axis of curvature or, still better, for both mirror surfaces to extend at right angles to both axes of curvature which then requires the axes of curvature to extend parallel to one another.

In a particularly preferred embodiment of an inventive high-power laser, which can, in particular, be produced relatively easily, the waveguide surfaces are formed by an azimuthally closed exterior surface of an internal cylinder and an azimuthally closed interior surface of an external cylinder so that the gas discharge chamber is arranged between the exterior surface and the interior surface.

Within the scope of the embodiments described thus far, the manner in which a laser beam is intended to be coupled out of the inventive high-power laser has not been considered in detail.

In a preferred embodiment, coupling out of the laser beam is accomplished through a partially permeable mirror region. This partially permeable mirror region can be realized either in that it reflects only a part of the impinging beam but allows the other part to pass through or that the partially permeable mirror region is provided with non-reflecting regions which make it possible for the laser beam to pass through.

A particularly expedient conception is constructed such that the partially permeable mirror region is located in a mirror surface reflecting the wave bundle system back and forth. This means that the initial wave bundle is limited by two fully reflecting mirror surfaces and partially permeable mirror regions are provided only in the region of the wave bundle system.

In a particularly advantageous construction of the inventive high-power laser, the partially permeable mirror region is penetrated by an exit wave bundle in an exit direction and the tangents at the two waveguide surface regions reflecting the exit wave bundle, these tangents extending at right angles to the exit direction, extend parallel to one another. This provides the possibility of coupling out in a region, in which the exit wave bundle does not experience any additional reflections in the transverse direction by the adjacent waveguide surface regions.

With regard to excitation of the inventive high-power laser, no details have so far been given. The waveguide walls bearing waveguide surfaces are preferably designed such that they comprise electrodes. Either electrodes can be placed on or inserted into these waveguide walls or the waveguide walls themselves can be designed as electrodes, i.e. consist, for example, of metal. As to the rest, reference is made to the comments in EP-A-0 305 893 with respect to the type of excitation, the type of laser gas and the possible wavelengths.

Additional features and advantages of the inventive high-power laser are the subject matter of the following description as well as the drawings of several embodiments.

DETAILED DISCLOSURE OF THE INVENTION

A first embodiment of an inventive high-power laser, illustrated in FIGS. 1 to 4, comprises an optical waveguide designated as a whole as 10 and having a lower waveguide surface 12 and an upper waveguide surface 14 which are each designed to be optically reflecting and face one another. These two waveguide surfaces 12 and 14 are supported by upper and lower waveguide walls 16 and 18, respectively, of the waveguide 10.

Figure 1:
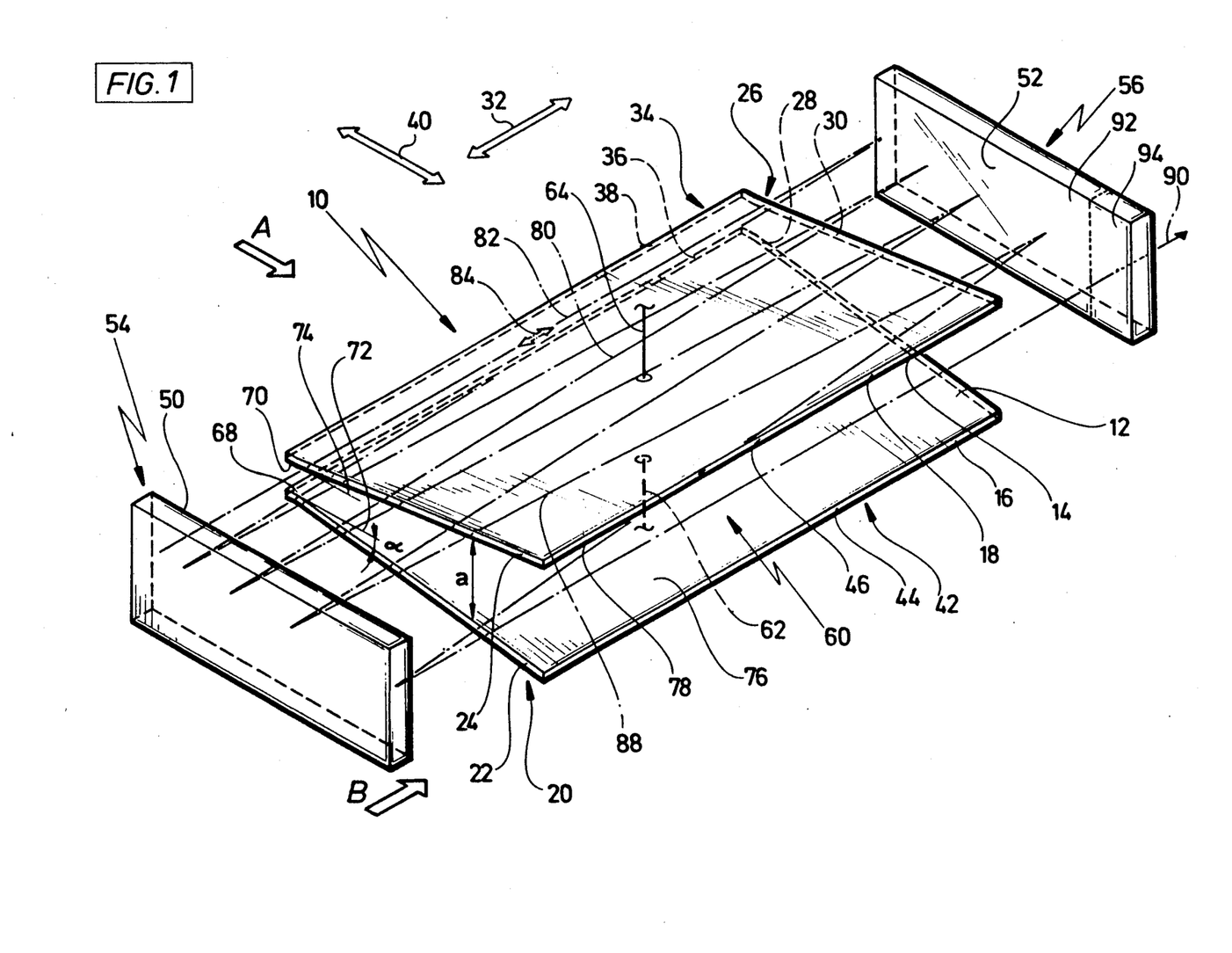
FIG. 1 is a perspective schematic illustration of a first embodiment not drawn to scale.

The waveguide surfaces 12 and 14 of the waveguide walls 16 and 18 extend from a front end face 20, formed by front end face edges 22 and 24, to a rear end face 26, formed by rear end face edges 28 and 30, in a longitudinal direction 32 as well as from a left longitudinal side 34 having longitudinal side edges 36 and 38 in a transverse direction 40 to a right longitudinal side 42 having longitudinal side edges 44 and 46.

Resonator mirror surfaces 50 and 52 of resonator mirrors 54 and 56 are arranged to face the two end faces 20 and 26, respectively, the resonator mirror surfaces 50 and 52 preferably being located in a plane running parallel to the end face edges 22 and 24 or 28 and 30. The resonator mirror surfaces 50 and 52 preferably extend parallel to one another and at right angles to the longitudinal direction 32.

A gas discharge chamber 60 is enclosed by the two waveguide surfaces 12 and 14 and, according to the invention, this chamber extends in the transverse direction 40 at least from the longitudinal side edges 36 and 38 as far as the longitudinal side edges 44 and 46 and, in the longitudinal direction 32, from the end face edges 22 and 24 as far as the end face edges 28 and 30, preferably, however, beyond these as far as the respective resonator mirrors 50 and 52.

The respective laser gas is enclosed in the gas discharge chamber. The gas is preferably located in this chamber free of flow, the gas molecules thereof merely migrating due to diffusion processes. The laser gas is hereby cooled preferably by impact with the waveguide surfaces 12 and 14 and cooling of the gas on the waveguide walls 16 and 18, whereby the waveguide walls are preferably cooled by a cooling means which, in the simplest case, comprises cooling channels extending in the waveguide walls 16 and 18.

The laser gas in the gas discharge chamber 60 is preferably excited by coupling in high frequency. In this respect, in a particularly favorable solution the waveguide walls 16 and 18 comprise high-frequency electrodes which are connected via high-frequency lines 62 and 64 with a high-frequency source not illustrated in the drawings.

In the simplest case, the waveguide walls 16 and 18 are made of metal which reflects the laser beam and so the waveguide surfaces 12 and 14 are formed directly by correspondingly treated surfaces of the waveguide walls 16 and 18.

Figure 2:
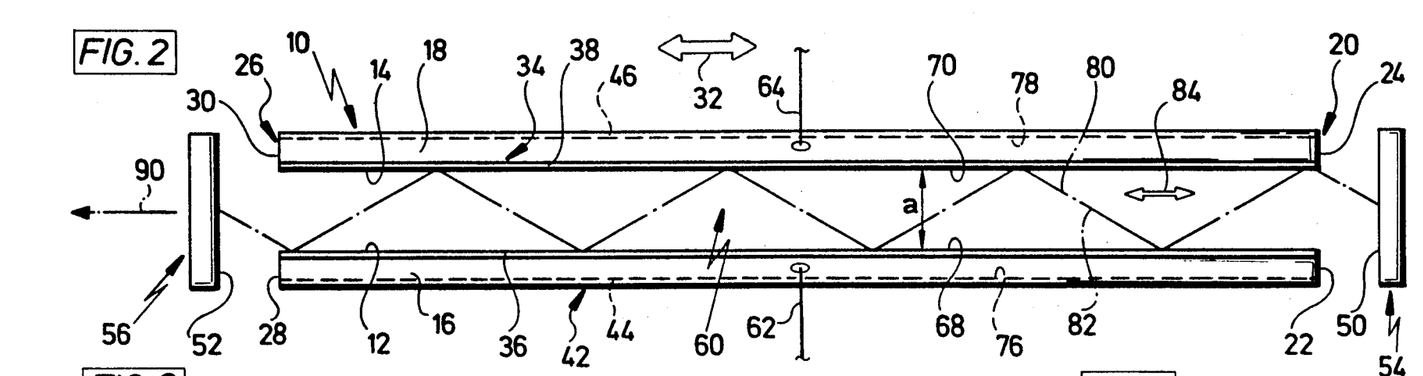
FIG. 2 is a view in the direction of arrow A in FIG. 1.
Figure 3:
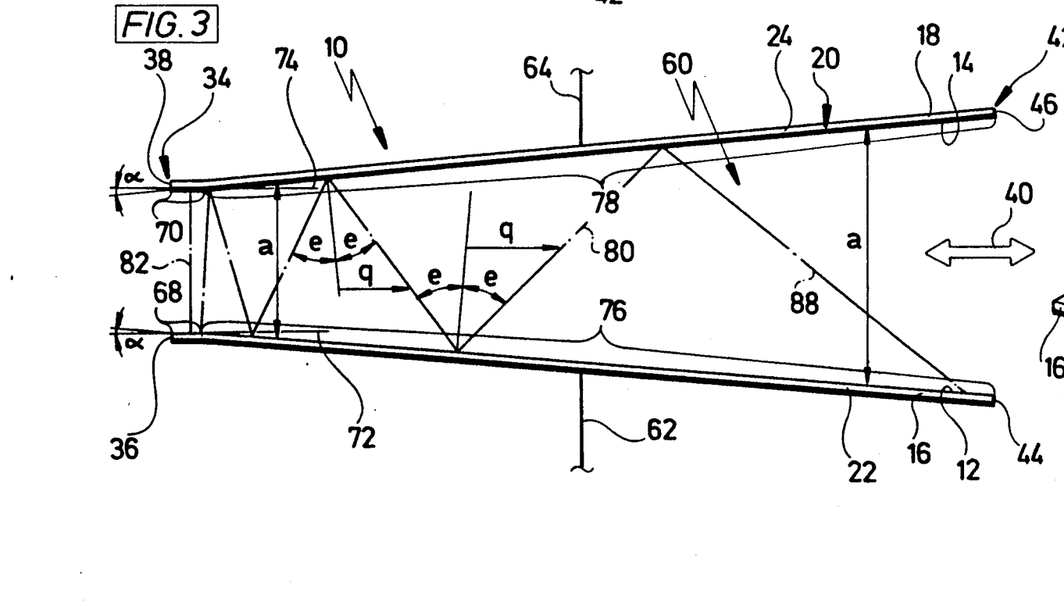
FIG. 3 is a view in the direction of arrow B in FIG. 1.

As illustrated in FIGS. 2 and 3, the waveguide surfaces 12 and 14 extend in the longitudinal direction 32 parallel to one another whereas, in the transverse direction 40, they have a distance a between them which continuously increases starting from the longitudinal side edges 36 and 38 and with increasing extension in the transverse direction 40, whereby the waveguide surfaces 12 and 14 still extend parallel to one another in the longitudinal direction 32. The waveguide surfaces 12 and 14 form varying regions in the transverse direction. First of all, they form immediately adjacent the longitudinal side edges 36 and 38 first waveguide surface regions 68 and 70, the tangents 72 and 74 of which, which extend at right angles to the longitudinal side edges 36 and 38, extend parallel to one another so that the first waveguide regions 68 and 70 are also aligned parallel to one another in the transverse direction 40 substantially over a short distance. Following the first waveguide regions 68 and 70, the waveguide surfaces 12 and 14 merge gradually into second waveguide surface regions 76 and 78, respectively, for example via a curved region, whereby the waveguide surface regions 76 and 78 are, in the simplest case, plane surfaces extending in a wedge shape to one another and each forming with the tangents 72 and 74 a wedge angle $\alpha$.

A waveguide 10 provided with waveguide surfaces 12 and 14 of this type leads in the longitudinal direction 32—as already known for waveguides having parallel waveguide surfaces—to a reflection of a light beam 80 back and forth between the waveguide surfaces 12 and 14 when this beam expands from one resonator mirror surface 50 to the other resonator mirror surface 52 or vice versa.

Figure 4:
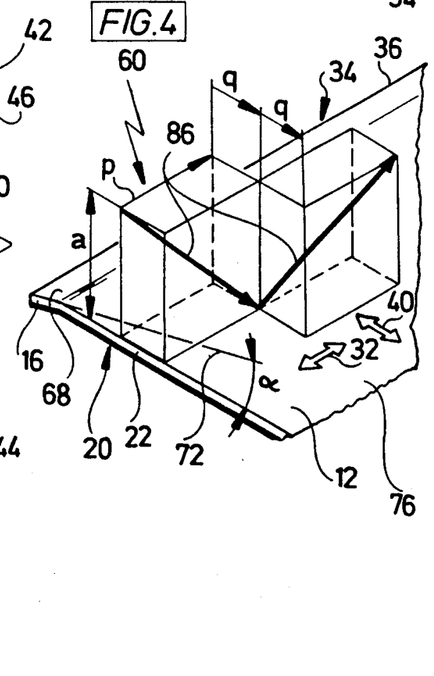
FIG. 4 is an enlarged illustration of a detail of a waveguide section in FIG. 1, not drawn to scale.

Since, in the first waveguide surface regions 68 and 70, the tangents 72 and 74 extend parallel to one another, an initial wave bundle 82, illustrated in FIGS. 1 and 4 is formed in the first waveguide surface region. When reflected on the waveguide surfaces 12 and 14, this wave bundle does not experience any reflection component in the transverse direction 40 but is merely reflected in the longitudinal direction 32. This initial wave bundle 82 therefore expands in an initial direction 84 which is at right angles at least to the resonator mirror surface 50, preferably also to the resonator mirror surface 52. In the embodiment illustrated in FIGS. 1 to 4 the initial direction 84 runs parallel to the longitudinal direction 32.

An "oscillation build-up" of the laser takes place in the form of the initial wave bundle 82, whereby the first waveguide surface regions 68 and 70 are designed to be as narrow as possible in the transverse direction 40, preferably essentially linear. As soon as the initial wave bundle is slightly deflected transversely to the initial direction 84, in the transverse direction 40 which also runs at right angles to the initial direction 84, the light beams 80 are reflected on one of the second waveguide surface regions 76 and 78 which, due to the fact that they do not extend parallel in the transverse direction 40, result in a reflected light beam being reflected in addition in the transverse direction 40. For the sake of simplicity, the reflection of a light beam 82 is depicted in FIG. 3 merely in the direction of the transverse direction 40. It can, however, be seen that the component q, with which the light beam 82 is reflected in the transverse direction, becomes steadily larger since the angle of incidence e gradually increases from reflection to reflection on the second waveguide surface regions 76 and 78.

FIG. 4 is a perspective illustration of the reflection on the second waveguide surface region 76 on the basis of a light beam 86 which expands with a component p parallel to the initial direction 84 and a component q parallel to the transverse direction 40.

Due to the reflection in the transverse direction 40, the initial wave bundle 82, as indicated schematically in FIG. 1, becomes a wave bundle system 88 which results from the initial wave bundle 82 by reflection back and forth on the resonator mirror surfaces 52 and 50 with an additional reflection component q in the transverse direction 40, caused by the reflections on the second waveguide surface regions 76 and 78. For the sake of clarity, the illustration of the wave bundle system 88 in FIG. 1 merely shows this with its components in the initial direction 84 and the transverse direction 40, and the reflection between the waveguide surfaces 12 and 14 has been omitted.

In order to be able to couple out a laser beam 90, the resonator mirror surface 50 is designed to be completely reflecting whereas the resonator mirror surface 52 has a completely reflecting region 92 which extends in the transverse direction from the longitudinal side 34 towards the longitudinal side 42 but ends at a distance from the longitudinal side 42 and merges into a partially reflecting region 94 which allows the laser beam 90 to exit essentially parallel to the initial direction 84.

In a second embodiment (FIG. 5) of an inventive high-power laser, only the waveguide 110 thereof has been shown for better illustration.

Figure 5:
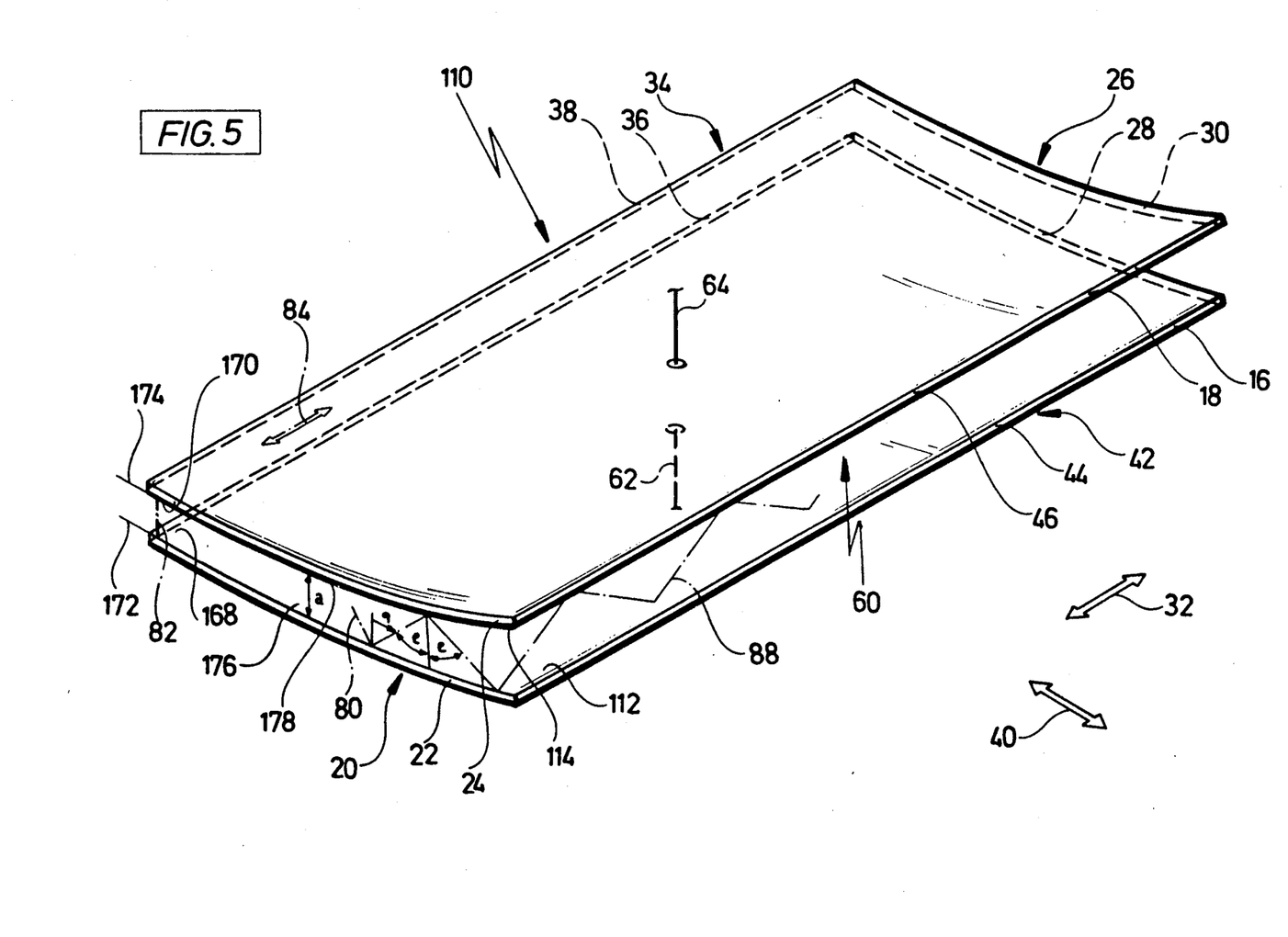
FIG. 5 is a perspective illustration of a second embodiment of an inventive high-power laser with mirrors omitted and not drawn to scale.

Insofar as the parts and elements are the same as those used in the first embodiment, these have been given the same reference numerals and so reference can be made in full to the comments concerning the first embodiment.

In contrast to the first embodiment, the waveguide surfaces 112 and 114 are provided with a constant curvature. The waveguide surface 112 has a concave curvature and the waveguide surface 114 a convex curvature.

In the same way as in the first embodiment, the waveguide surfaces 112 and 114 have first waveguide surface regions 168 and 170, the tangents 172 and 174 of which extend parallel to one another. The first waveguide surface region limits the initial wave bundle 82 which expands in the initial direction 84 extending at right angles to the tangents 174 and 172 and at right angles to the resonator mirror surface 50 which is a plane mirror surface and not illustrated in the drawing.

These first waveguide regions 168 and 170 are followed by the second waveguide regions 176 and 178. The distance a between them increases with increasing extension thereof in the transverse direction 40, whereby in contrast to the first embodiment the second waveguide surfaces regions 176 and 178 are essentially not planes but curved surfaces.

In the same way as in the first embodiment, the waveguide surfaces 112 and 114 have, however, the same distance a over their entire extension parallel to the initial direction 84.

The second embodiment functions in the same manner as the first embodiment, i.e. the initial wave bundle 82 is formed and proceeding from this a wave bundle system 88 then expands with spatial coherence in the transverse direction 40, the laser beam 90 being coupled out in the same manner via a partially permeable mirror surface.

Figure 6:
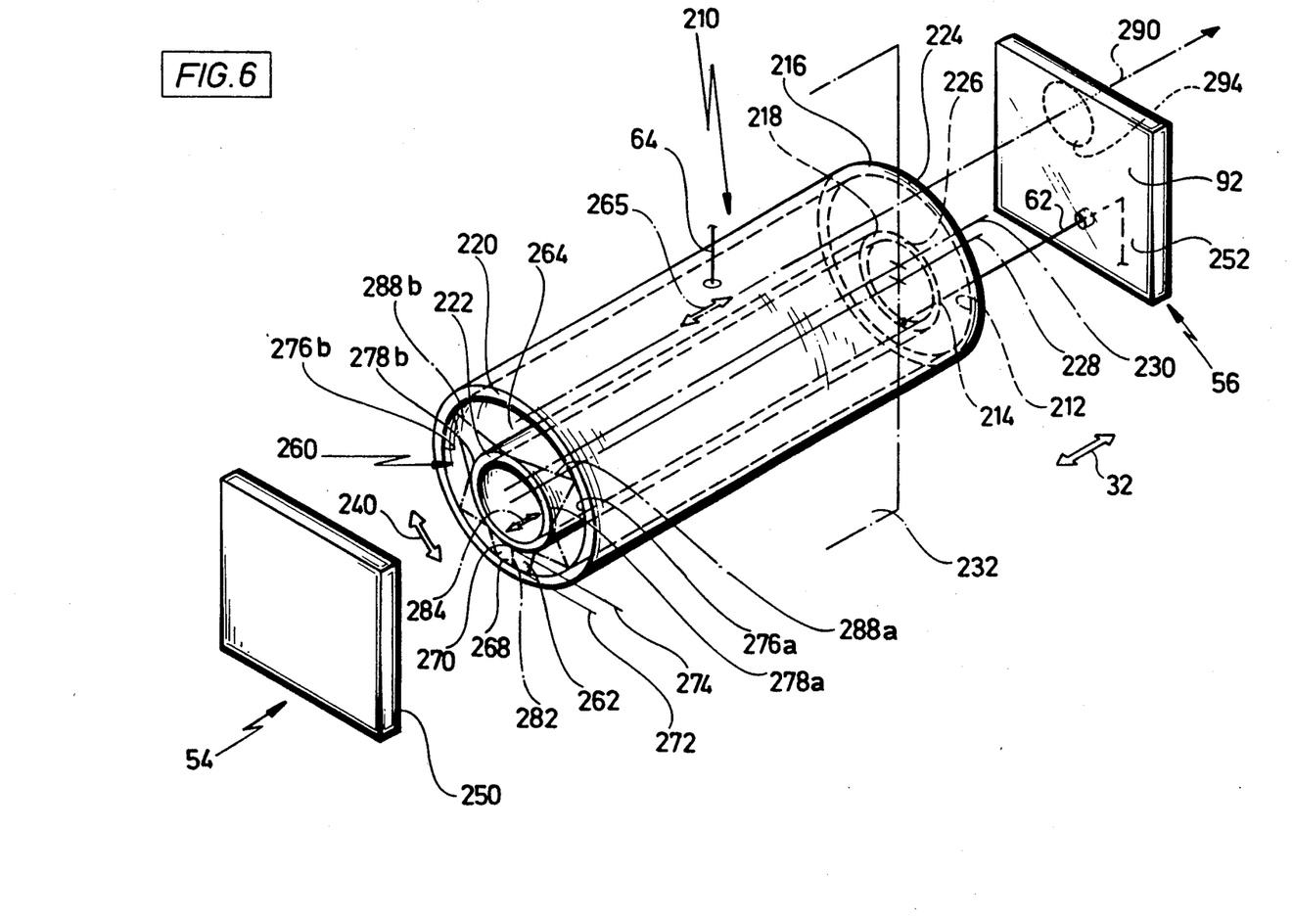
FIG. 6 is a perspective illustration of a third embodiment in an exaggerated representation not drawn to scale.

In a third embodiment of the inventive high-power laser, illustrated in FIG. 6, the waveguide 210 is formed by two cylinders 216 and 218 arranged one within the other. The cylinder 216 has an interior surface 212 which represents one waveguide surface while the cylinder 218 has an exterior surface 214 which forms the other waveguide surface.

These two cylinders 216 and 218 have front end faces 220 and 222, respectively, as well as rear end faces 224 and 226, respectively, the front end faces 220 and 222 and the rear end faces 224 and 226 being located in respective planes.

In addition, the cylinders 216 and 218 have cylinder axes 228 and 230, respectively, which, as shown in FIG. 6, extend parallel to one another but at a distance from one another and are located in a plane 232. The inner cylinder 218 is not, therefore, arranged coaxially to the outer cylinder 216 but offset in accordance with the distance between the cylinder axes 228 and 230 so that the gas discharge chamber 260 formed between the waveguide surfaces 212 and 214 has an irregular, radial extension relative to the cylinder axis 228, with a narrowest point 262 and a widest point 264 which are both located in the plane 232.

In view of the fact that the waveguide surfaces 212 and 214 are cylinder surfaces, the tangents 272 and 274 at the waveguide surfaces 212 and 214 extend parallel to one another at the narrowest point 262 along the line of intersection of the plane 232 with the waveguide surfaces 212 and 214. The tangents 272 and 274 hereby extend parallel to a transverse direction 240 which represents an azimuthal direction in relation to the cylinder axis 228 and is at right angles to the initial direction 284 in which the initial wave bundle 82, which is formed in the region of the narrowest point 262, expands.

For the same reason, the tangents at the waveguide surfaces 212 and 214 are also parallel to one another along the line of intersection with the plane 232 at the widest point 264.

In principle, this third embodiment illustrated in FIG. 6 functions in exactly the same manner as the first and second embodiments. This means that the initial wave bundle 282 is formed at the narrowest point 262 and is limited by first waveguide surface regions 268 and 270 extending linearly parallel to the initial direction 284 and that proceeding from this initial wave bundle 282 a wave bundle system 288a and 288b expands on either side of the narrowest point 262 as far as the widest point 264. Since these two wave bundle systems 288a and 288b resulted from the same initial wave bundle, they are also coherent with one another so that a substantially homogeneous, closed distribution of intensity is formed over the entire azimuthal direction 240 in relation to the cylinder axis 228.

In the simplest case, in the embodiment illustrated in FIG. 6 the two resonator mirror surfaces 250 and 252 are parallel to one another and for coupling out the laser beam 290 the rear resonator mirror surface 252 has in the region of the widest point 264 a partially permeable region 294, through which an exit wave bundle, which is limited by the waveguide surfaces 212 and 214 at the widest point 264 and expands in an exit direction 265, exits.

Moreover, it is also advantageous in the simplest case for the resonator mirror surfaces 250 and 252 to extend at right angles to the cylinder axes 228 and 230.

In variations of the third embodiment it is, however, also conceivable for the resonator mirror surfaces 250 and 252 to extend neither parallel to one another nor at right angles to the cylinder axes 228 and 230. The only condition is that one of the resonator mirror surfaces, in this case the resonator mirror surface 250, is at right angles to the initial direction 284, proceeding from which the initial wave bundle 282 expands in the waveguide 210.

Moreover, the third embodiment functions in accordance with the same principle as the first and second embodiments since the distance between the waveguide surfaces 212 and 214 increases with increasing extension in the azimuthal direction 240, proceeding from the narrowest point 262 and the first waveguide surface regions 268 and 270 with the following waveguide surface regions 276a and b as well as 278a and b, i.e. the distance between the waveguide surfaces becomes increasingly bigger. This means that the same effect occurs as in the first embodiment, i.e. a reflection of the beam in azimuthal direction 240, and so reference can be made to the detailed comments on the first embodiment concerning this reflection in the transverse direction or azimuthal direction 240.

Figures 7, 8:
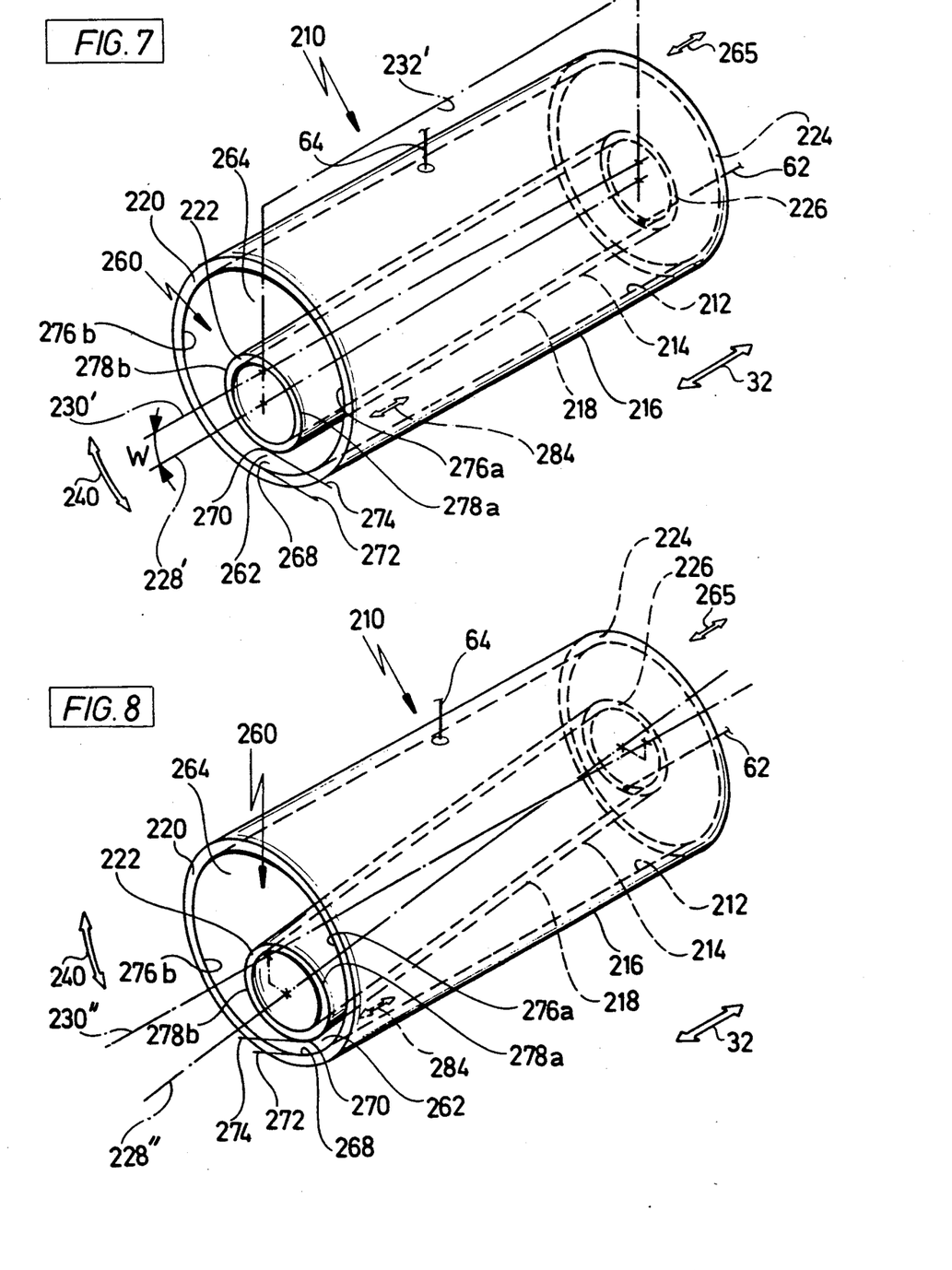
FIG. 7 is a perspective illustration of a fourth embodiment with mirrors omitted, similar to FIG. 6, in an exaggerated representation not drawn to scale
FIG. 8 is a perspective illustration of a fifth embodiment with mirrors omitted, similar to FIG. 6, in an exaggerated representation not drawn to scale.

In a fourth embodiment, illustrated in FIG. 7, the elements and parts which are identical to those of the third embodiment have been given the same reference numerals and so reference can be made in full to the comments concerning the third embodiment.

In contrast to the third embodiment, only the two cylinder axes 228' and 230' are not aligned parallel to one another but are located in a plane 232' and, in this plane 232', form an angle w with one another.

In the same manner, the narrowest point 262 is located in the plane 232' and the initial direction 284 extends in the plane 232' so that the tangents 272' and 274' at the waveguide surfaces 212 and 214 also extend at right angles to the initial direction 284 and parallel to one another in the region of the narrowest point 262. The only difference between this and the third embodiment is the fact that in the initial direction the distance between the first waveguide surface regions 268 and 270 is not constant but varies according to the angular position of the cylinder axes 228' and 230' relative to one another. This does not, however, lead to any deflection of the initial wave bundle 282 in the transverse direction 240 but merely alters the reflection conditions in one or other of the directions. The reflection in transverse direction 240 does not occur until the second waveguide regions 276 and 278 which follow the first waveguide regions 268 and 270.

Therefore, in principle the fourth embodiment functions in exactly the same manner as the third embodiment.

The conditions in a fifth embodiment, illustrated in FIG. 8, are in principle the same as in the third and fourth embodiments, the only difference being that the cylinder axes 228" and 230" are now skewed in relation to one another. In this case, the initial direction 284 need not necessarily extend parallel to the cylinder axes 228" and 230" but can be inclined hereto. The path of the cylinder axis 284 is then defined by the first waveguide surface regions 268 and 270, their tangents, which are aligned at right angles to the initial direction 284, extending parallel to one another.

With regard to the resonator mirror surfaces, the only condition is to be seen in the fact that the initial direction 284 is at right angles to a resonator mirror surface and expands proceeding from this surface.

As for the rest, reference is made to the detailed comments concerning the embodiments described above.

In all the embodiments which are not illustrated to scale, the distance between the first waveguide surface regions, in a functioning embodiment, is approximately 1.5 mm, the distance between the second waveguide surface regions is approximately 1.5 mm to approximately 2 mm, the extension of the second waveguide surface regions in the transverse direction is approximately 30 mm to 100 mm and the extension of the waveguide surface regions in the initial direction is approximately 200 mm to 600 mm. Preferably, $CO_2+N_2+He$ is used as laser gas at a pressure of approximately 150 millibars and is excited at frequencies of approximately 100 MHz to 200 MHz.

The present disclosure relates to the subject matter disclosed in German application No. P 40 26 516.1 of Aug. 22, 1990, the entire specification of which is incorporated herein by reference.

What is claimed is:

1. A high-power laser comprising:
   two resonator mirrors having first and second resonator mirror surfaces arranged opposite one another;
   a waveguide extending between said first and second resonator mirror surfaces and having two reflecting waveguide surfaces located opposite one another and facing a gas discharge chamber enclosed by the waveguide for holding a gas excitable by high frequency energy;
   a beam path having an initial bundle of lightwaves, said initial bundle expanding towards the second mirror surface in an initial direction extending at right angles to a region of the first mirror surface and due to multiple back and forth reflection between the second and the first mirror surfaces expanding with spatial coherence as a wave bundle system between the two reflecting waveguide surfaces in a transverse direction extending at right angles to said initial direction; wherein:
   first and second tangents at two first waveguide surface regions reflecting the initial wave bundle extend parallel to one another, said tangents also extending at right angles to said initial direction; and
   a distance between second waveguide surface regions following the first two waveguide surface regions becomes steadily larger proceeding from an initial distance between the two first waveguide surface regions over an expansion path along said transverse direction with increasing expansion of the wave bundle system.

2. A high-power laser as defined in claim 1, wherein the first resonator mirror surface is planar.

3. A high-power laser as defined in claim 2, wherein the second resonator mirror surface is planar.

4. A high-power laser as defined in claim 3, wherein the resonator mirror surfaces extend parallel to one another.

5. A high-power laser as defined in claim 3, wherein the resonator mirror surfaces extend at an angle to one another.

6. A high-power laser as defined in cliam 1, wherein the first waveguide surface regions have a substantially linear extension in the transverse direction.

7. A high-power laser as defined in claim 1, wherein the distance between the second waveguide surface regions following the first two waveguide surface regions which reflect the initial wave bundle becomes steadily larger over the entire extension of the second waveguide surface regions in the transverse direction.

8. A high-power laser as defined in cliam 1, wherein one of the two reflecting waveguide surfaces is convex in the transverse direction and the other of the two reflecting waveguide surfaces is concave in the transverse direction.

9. A high-power laser as defined in cliam 1, wherein the two reflecting waveguide surfaces are cylindrically curved about respective axes of curvature in the transverse direction.

10. A high-power laser as defined in claim 9, wherein the axes of curvature of the waveguide surfaces extend parallel to and at a distance from one another.

11. A high-power laser as defined in claim 10, wherein one mirror surface extends at right angles to an axis of curvature.

12. A high-power laser as defined in claim 9, wherein the axes of curvature form an angle with one another.

13. A high-power laser as defined in claim 9, wherein the axes of curvature are skewed relative to one another.

14. A high-power laser as defined in claim 9, wherein the waveguide surfaces are formed by an azimuthally closed interior surface of an external cylinder and an azimuthally closed exterior surface of an internal cylinder.

15. A high-power laser as defined in claim 1 further comprising a partially permeable mirror region for outputting a laser beam.

16. A high-power laser as defined in cliam 15, wherein the partially permeable mirror region is located in a resonator mirror surface reflecting the wave bundle system back and forth.

17. A high-power laser as defined in claim 15, wherein the partially permeable mirror region is penetrated by an exit wave bundle in an exit direction and the two waveguide surface regions reflecting the exit wave bundle have respective tangents that extend at right angles to the exit direction and extend parallel to one another.

* * * * *